(12) United States Patent
Xu et al.

(10) Patent No.: US 9,447,800 B2
(45) Date of Patent: Sep. 20, 2016

(54) MOUNTING APPARATUS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Mao-Lin Xu, Wuhan (CN); Zhi-Qiang Li, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 57 days.

(21) Appl. No.: 14/530,264

(22) Filed: Oct. 31, 2014

(65) Prior Publication Data
US 2016/0105978 A1 Apr. 14, 2016

(30) Foreign Application Priority Data

Oct. 14, 2014 (CN) .......................... 2014 1 0540845

(51) Int. Cl.
*F16M 11/00* (2006.01)
*F16B 2/12* (2006.01)
*G06F 1/18* (2006.01)

(52) U.S. Cl.
CPC .. *F16B 2/12* (2013.01); *G06F 1/18* (2013.01)

(58) Field of Classification Search
USPC .............. 248/917, 918, 346.01, 371, 346.04, 248/316.1, 316.8
See application file for complete search history.

(56) References Cited

U.S. PATENT DOCUMENTS

| | | | |
|---|---|---|---|
| 7,684,175 B2 * | 3/2010 | Takao | F16M 11/00 248/276.1 |
| 8,348,206 B2 * | 1/2013 | Wang | F16M 11/10 16/343 |
| 8,837,131 B1 * | 9/2014 | Colby | G06F 1/1667 361/679.06 |
| 2014/0218855 A1 * | 8/2014 | Fujino | G06F 1/1654 361/679.12 |

* cited by examiner

*Primary Examiner* — Steven Marsh
(74) *Attorney, Agent, or Firm* — Zhigang Ma

(57) ABSTRACT

A mounting apparatus includes an enclosure for mounting a receiving member, a bracket, and a movable member mounted to the enclosure. The receiving member is configured to receive an electronic component. The bracket includes a bracket body movably mounted to the enclosure and an operating member mounted to the bracket body. The movable member includes a movable body and a movable block mounted to the movable body. The movable body is mounted to the bracket body. The operating member is pressed in a first direction toward the enclosure to drive the bracket body to rotate, the movable body moves a second direction away from the enclosure, thereby the movable block can move in a third direction away from the enclosure to push the electronic component and the electronic component can move in the second direction. The third direction is different from the first direction.

20 Claims, 16 Drawing Sheets

MOUNTING APPARATUS

CROSS-REFERENCE TO RELATED APPLICATIONS

This application claims priority to Chinese Patent Application No. 201410540845.X Oct. 14, 2014, the contents of which are incorporated by reference herein.

FIELD

The subject matter herein generally relates to an mounting apparatus for securing an electronic component.

BACKGROUND

A mounting apparatus is used to secure an electronic component.

BRIEF DESCRIPTION OF THE DRAWINGS

Implementations of the present technology will now be described, by way of example only, with reference to the attached figures.

DETAILED DESCRIPTION

Figure 1:
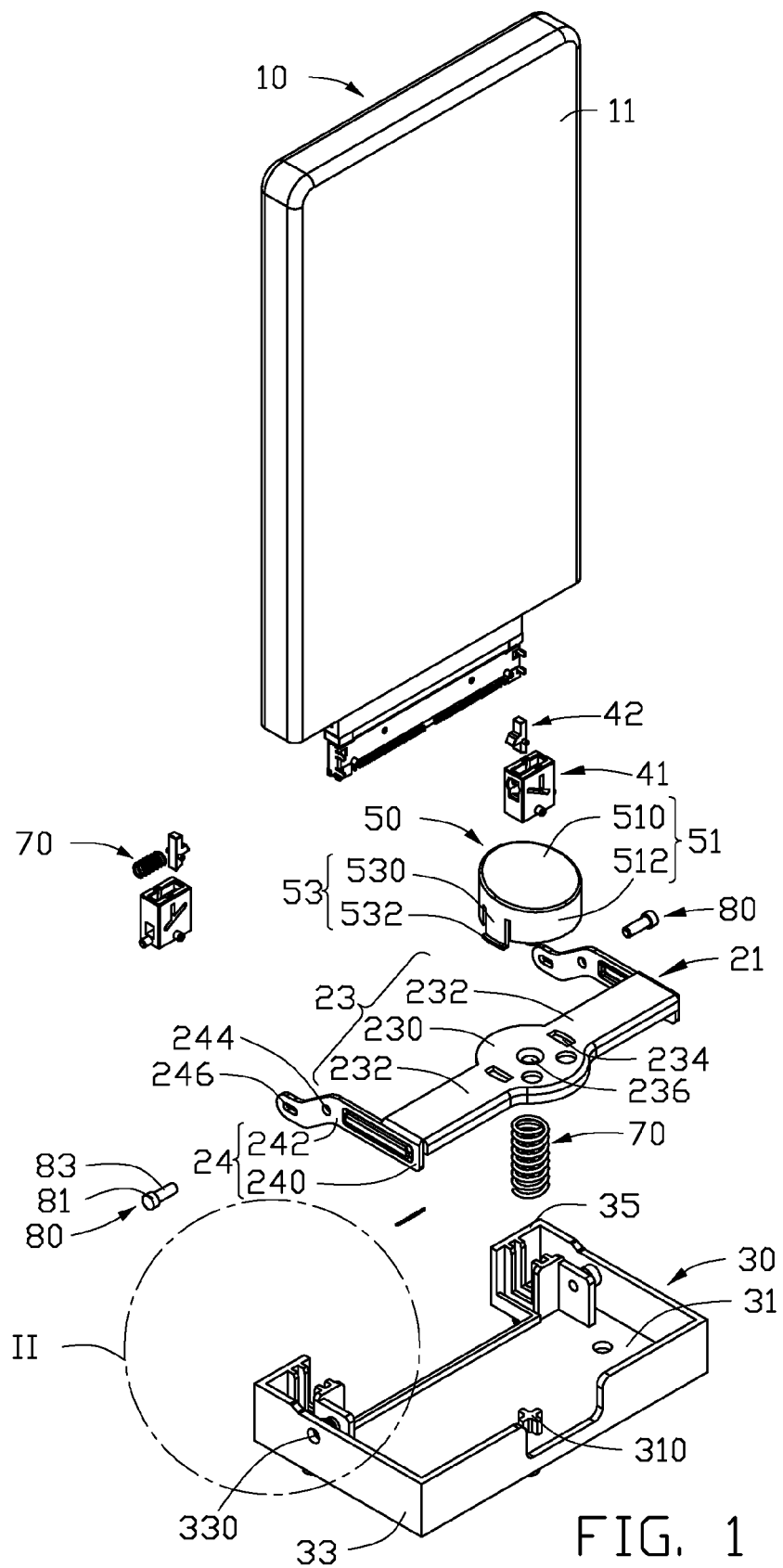
FIG. 1 is an exploded, isometric view of an embodiment of a mounting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "comprising, but not necessarily limited to"; it specifically indicates open-ended inclusion or membership in the so-described combination, group, series and the like.

The present disclosure is described in relation to a mounting apparatus for securing an electronic component.

Figure 2:
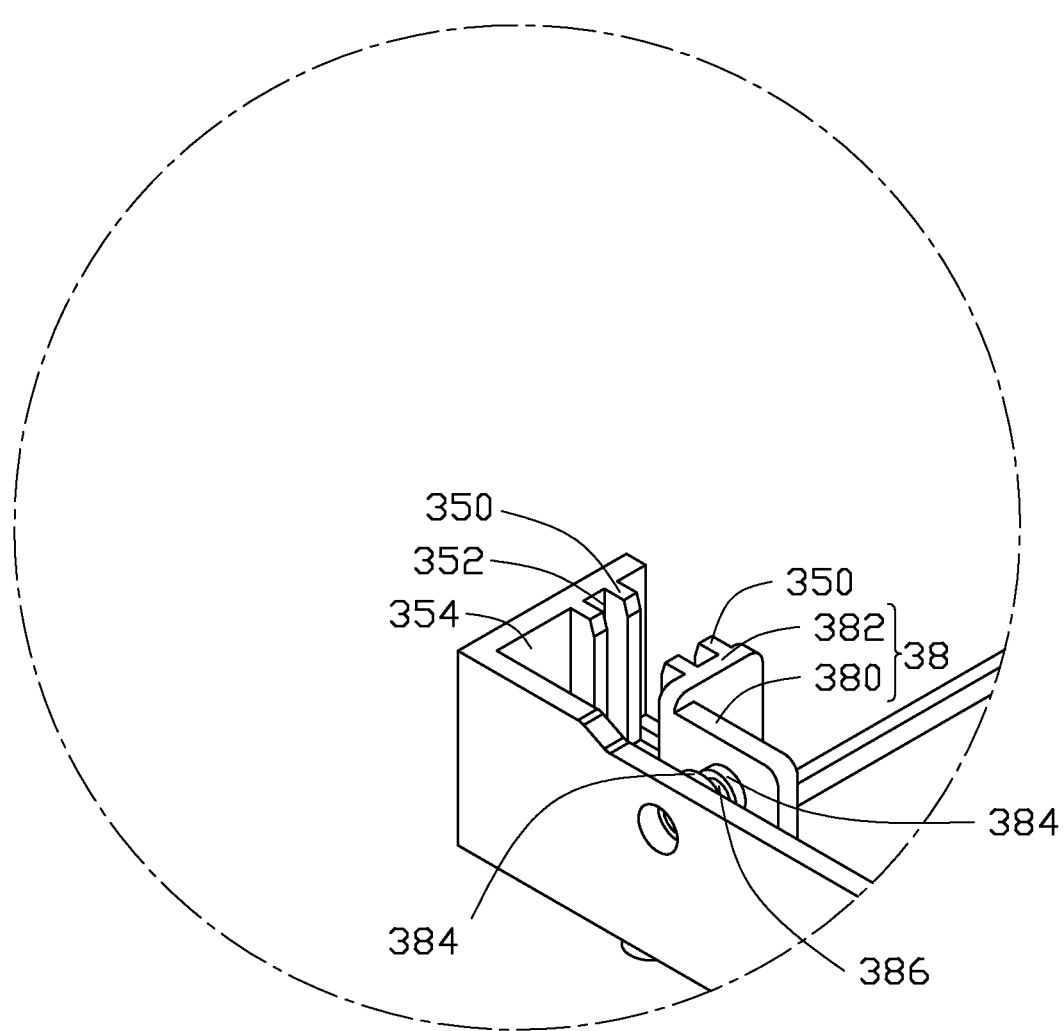
FIG. 2 is an enlarged view of a circled portion II of FIG. 1.
Figure 3:
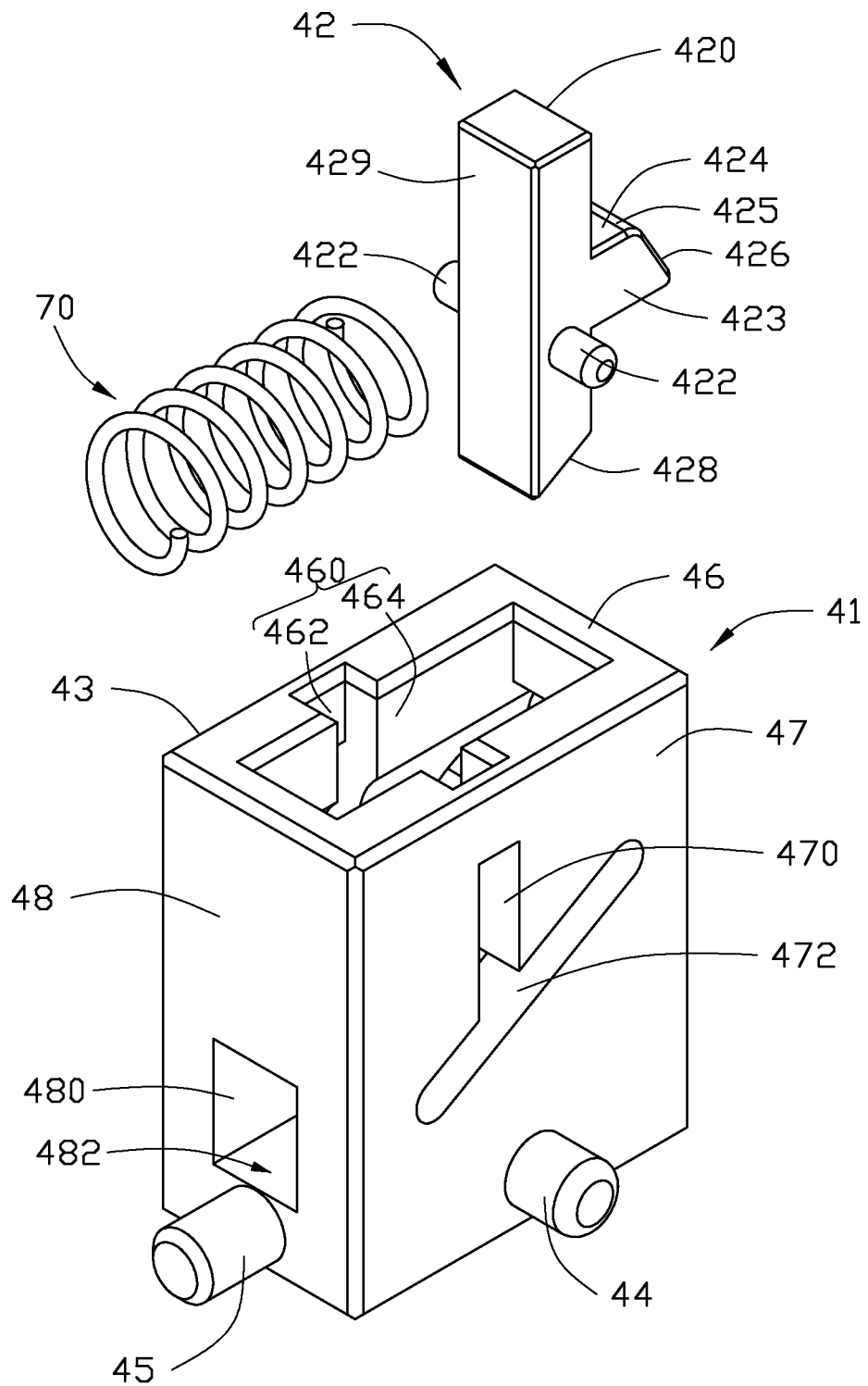
FIG. 3 is an exploded, isometric view of an embodiment of a movable member of the mounting apparatus of FIG. 1.
Figure 4:
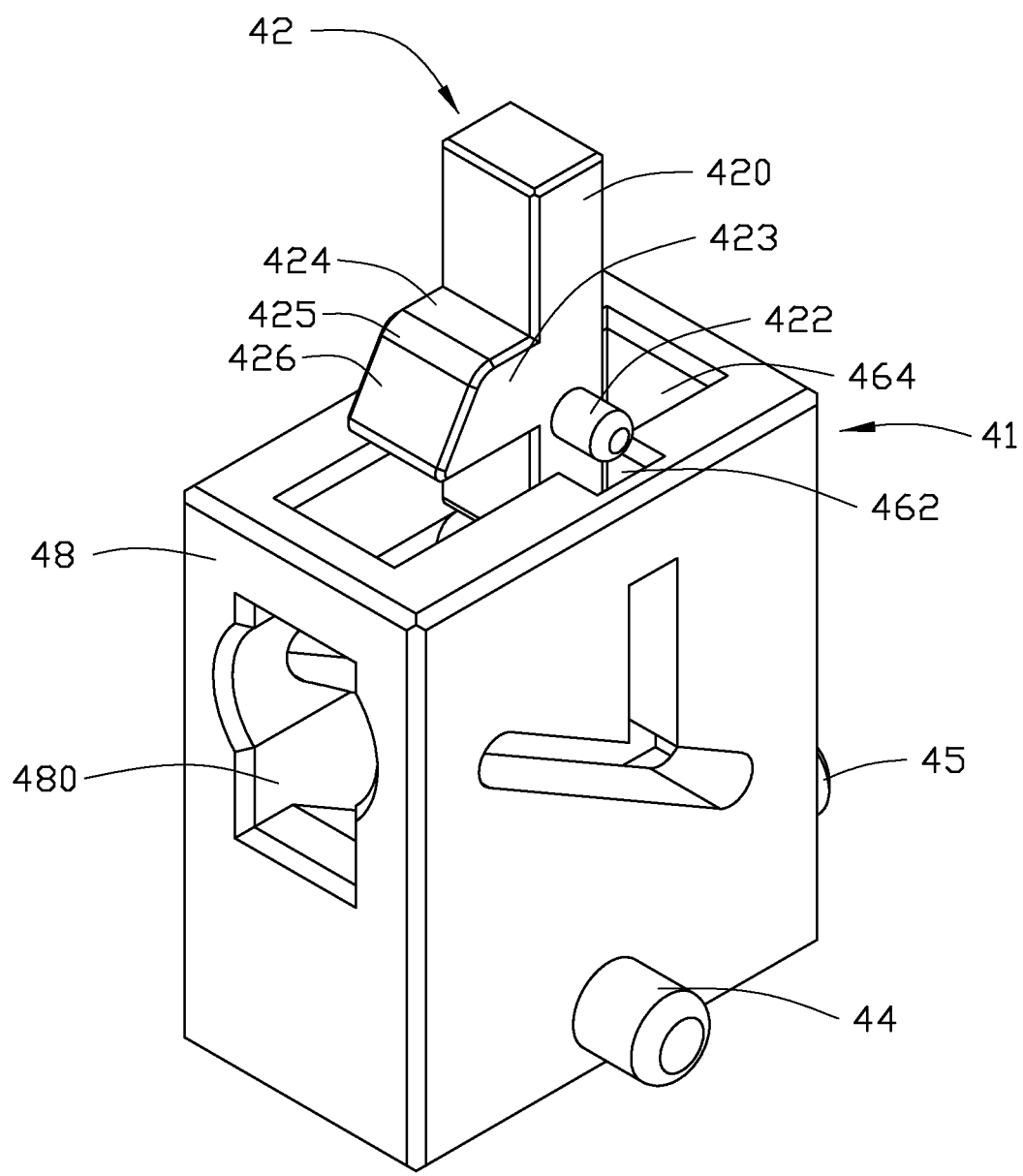
FIG. 4 is an assembled, isometric view of the movable member of FIG. 3.
Figure 5:
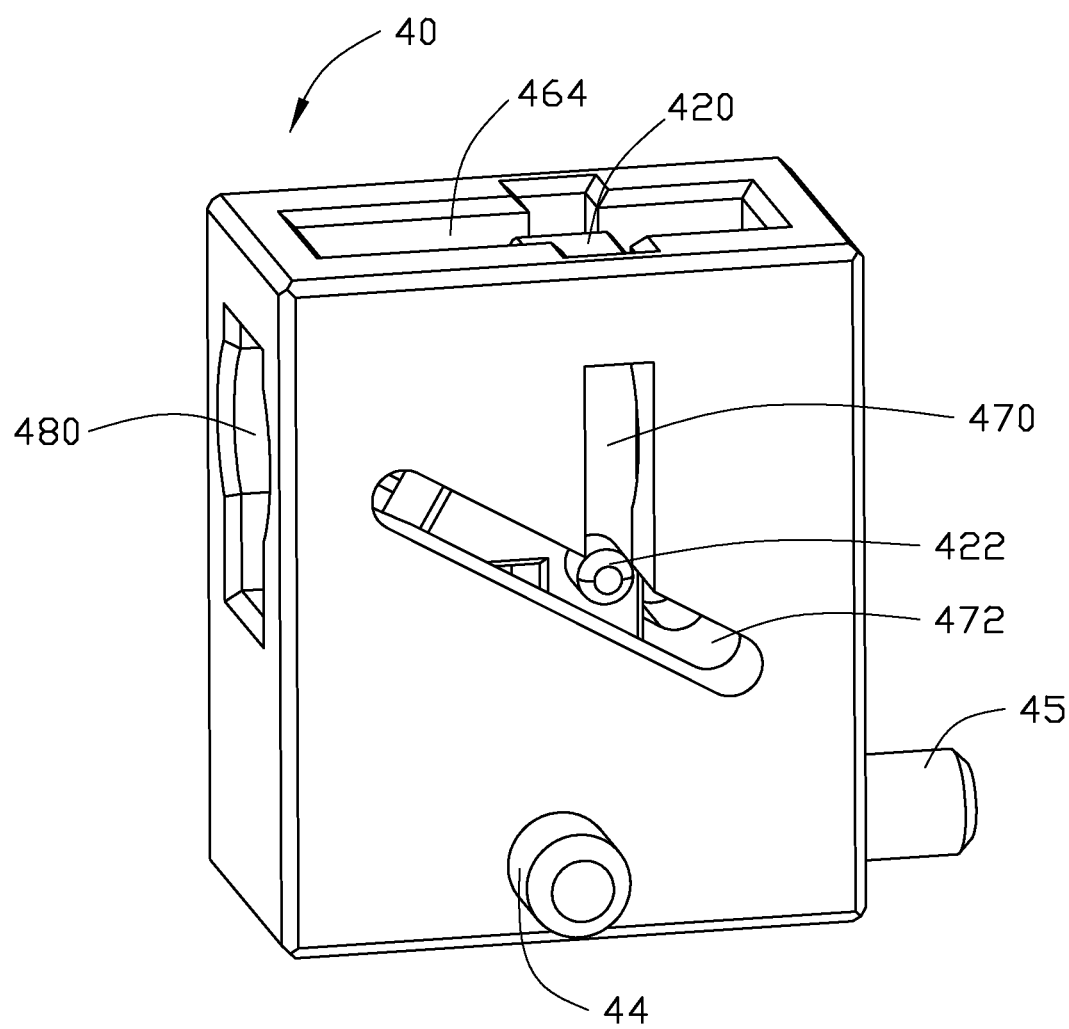
FIG. 5 is similar to FIG. 4, but a movable block is received in a movable portion, an elastic device is elastically deformed.

FIGS. 1 and 2 illustrate one embodiment of a mounting apparatus for securing an electronic component 10. The mounting apparatus comprises a bracket 20 (shown in FIG. 7), an enclosure 30, and two movable members 40. A receiving member 60 is mounted on the enclosure 30. The electronic component 10 is configured to be inserted into the receiving member 60.

Figure 10:
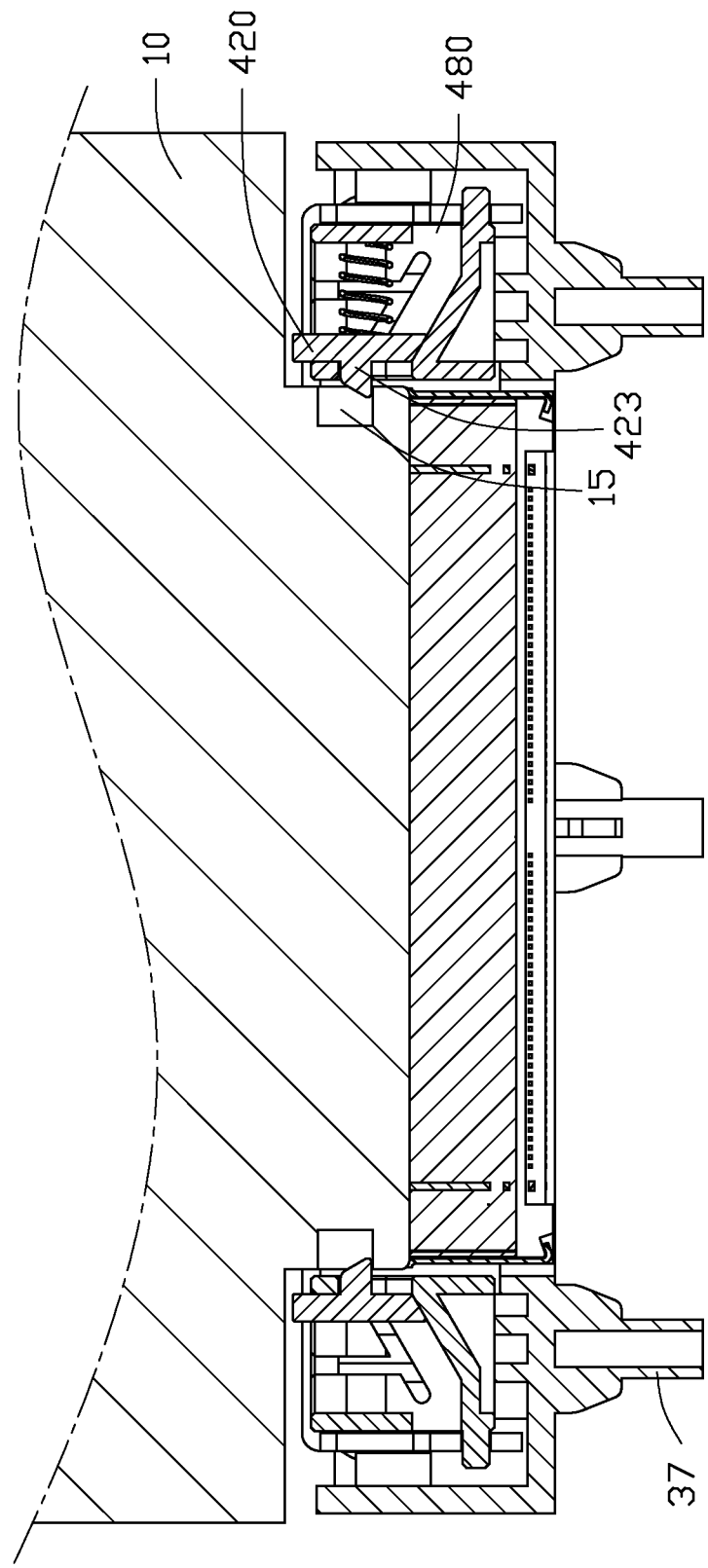
FIG. 10 is a partial, cross-sectional view of the mounting apparatus of FIG. 9.
Figure 11:
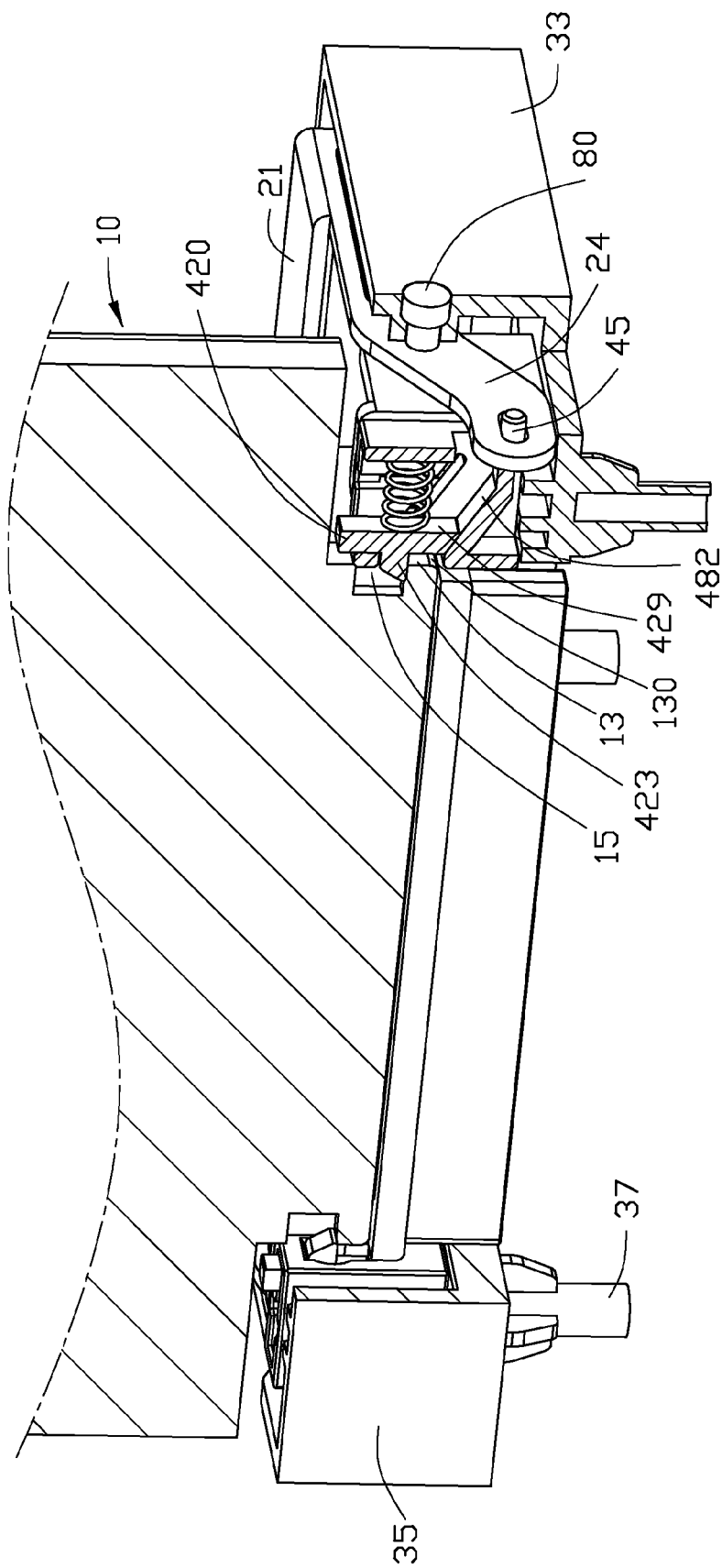
FIG. 11 is a partial, isometric, cross-sectional, view of the mounting apparatus of FIG. 9.
Figure 12:
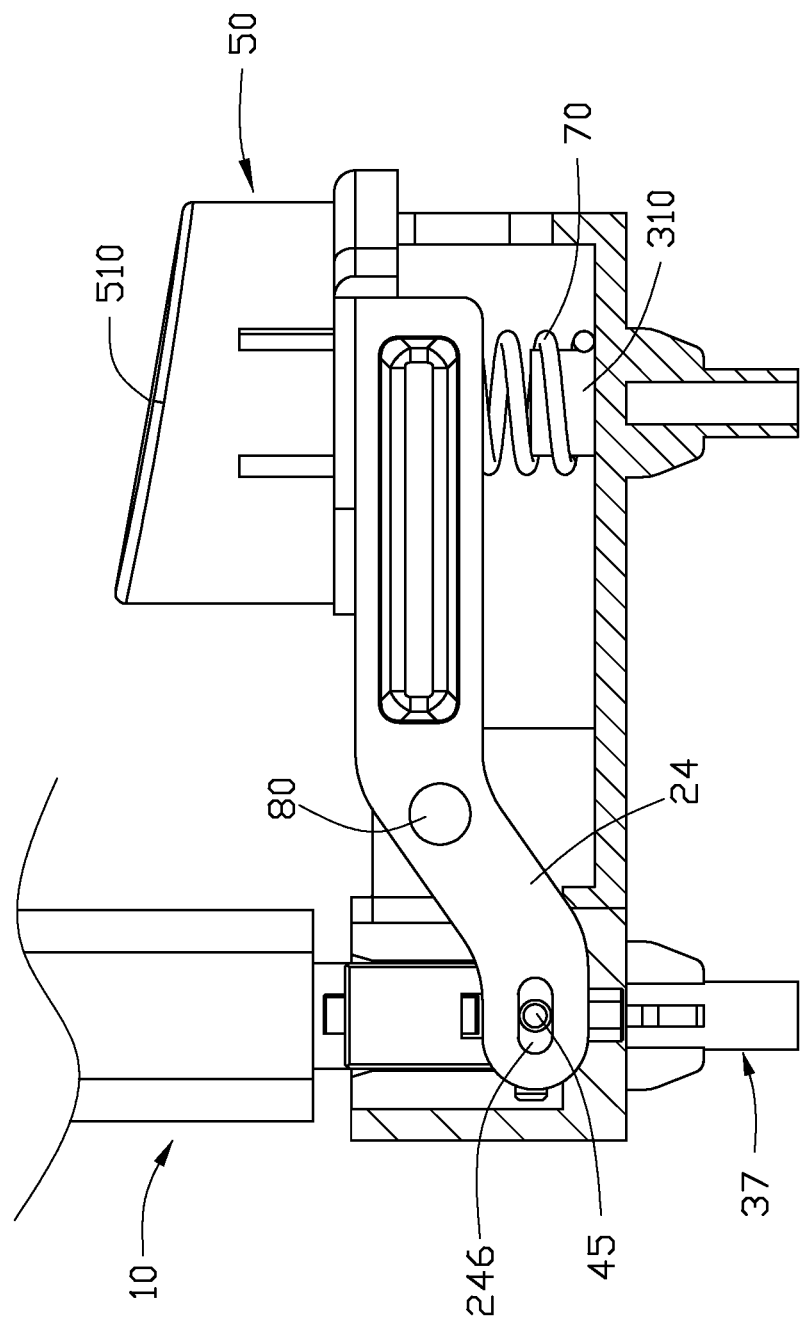
FIG. 12 is similar to FIG. 10, but viewed from a different angle.
Figure 13:
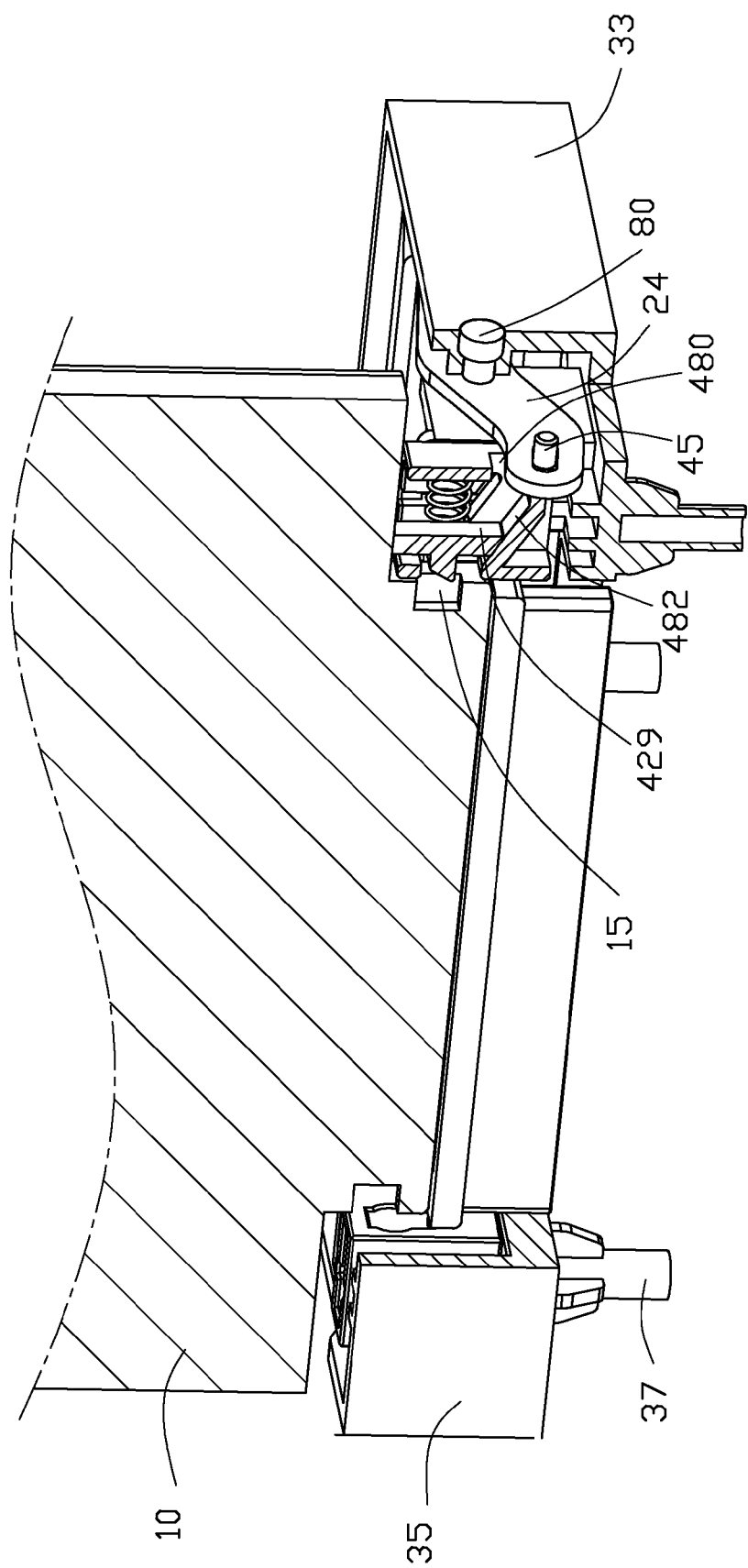
FIG. 13 is similar to FIG. 10, but a back plate is partially shown, an operating member is pressed to enable the movable block to push the elastic device.
Figure 14:
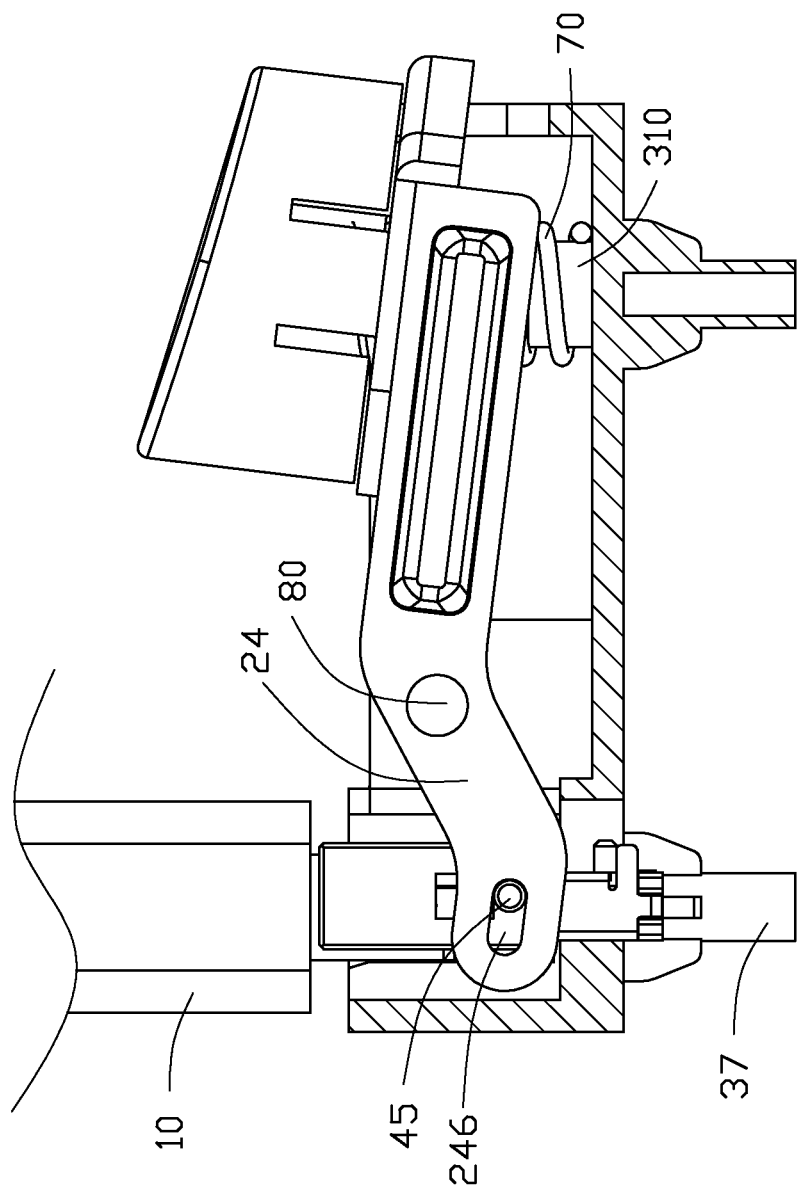
FIG. 14 is similar to FIG. 12, but the operating member is pressed to enable the movable block to push the elastic device.
Figure 15:
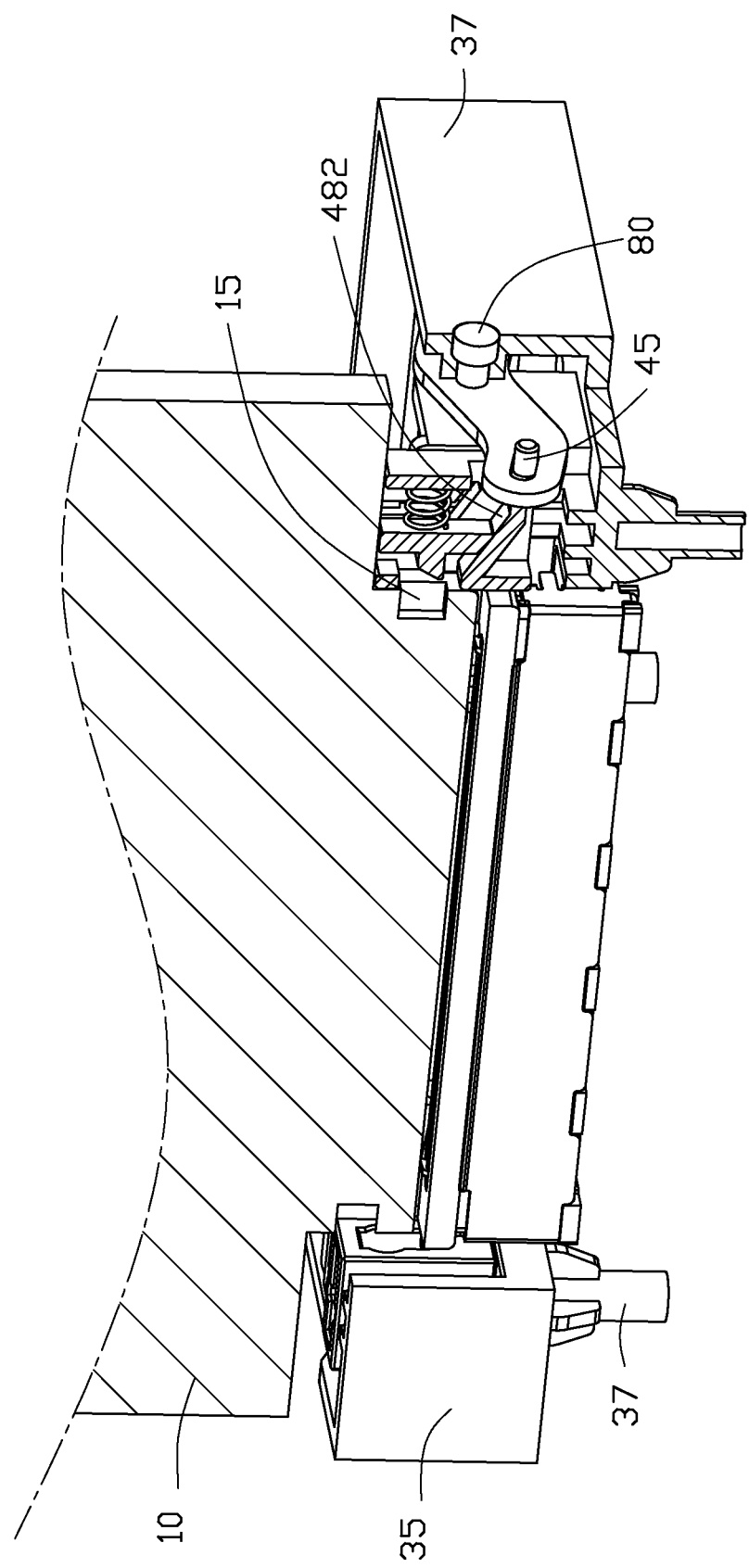
FIG. 15 is similar to FIG. 13, but the operating member is sequentially pressed to enable the movable block to sequentially push the elastic device.
Figure 16:
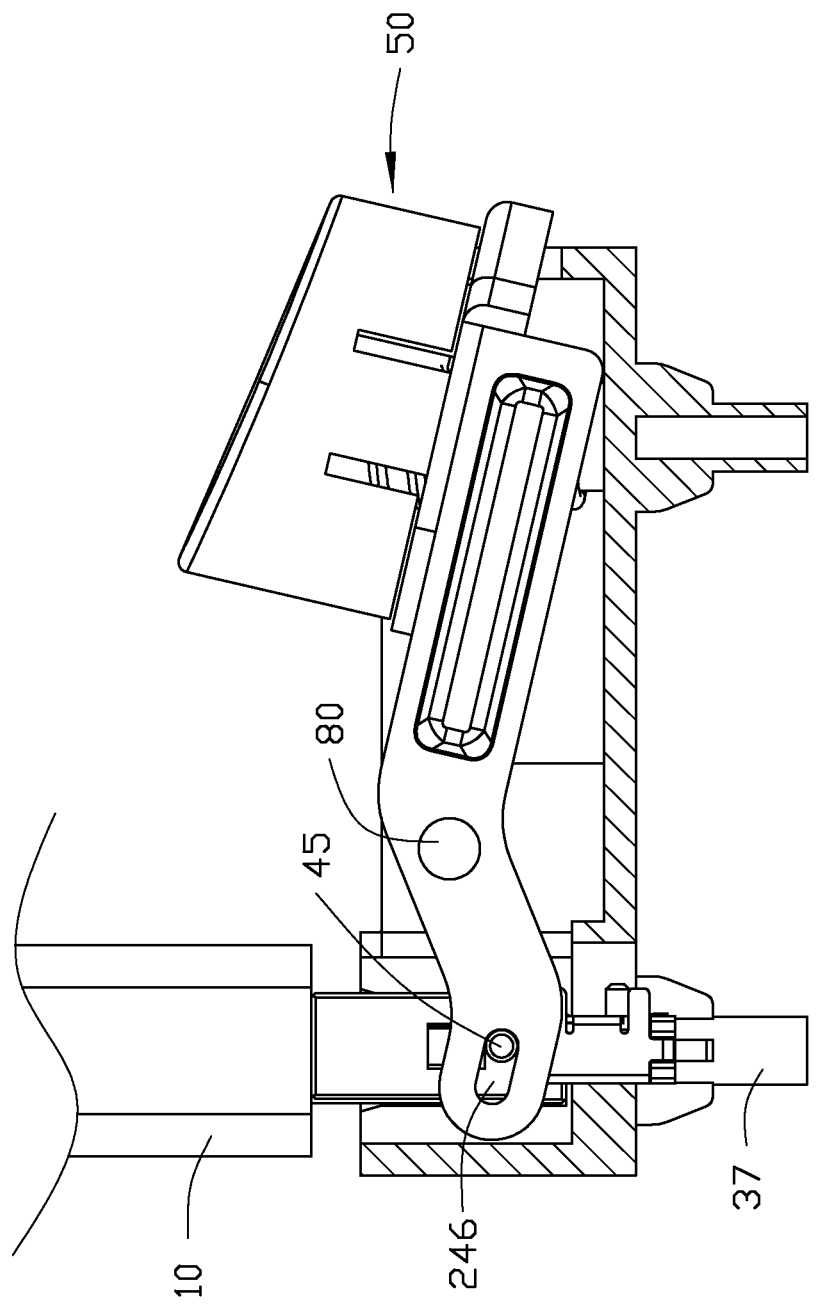
FIG. 16 is similar to FIG. 14, but the elastic device is pushed to disengage from the receiving member.

The electronic component 10 comprises an electronic component body 11 and two inserting portions 13 (shown in FIG. 11) extending from the electronic component body 11. The electronic component 10 defines two receiving spaces 15 (shown in FIG. 10). Each inserting portion 13 comprises a bent surface 130 (shown in FIG. 11).

Figure 7:
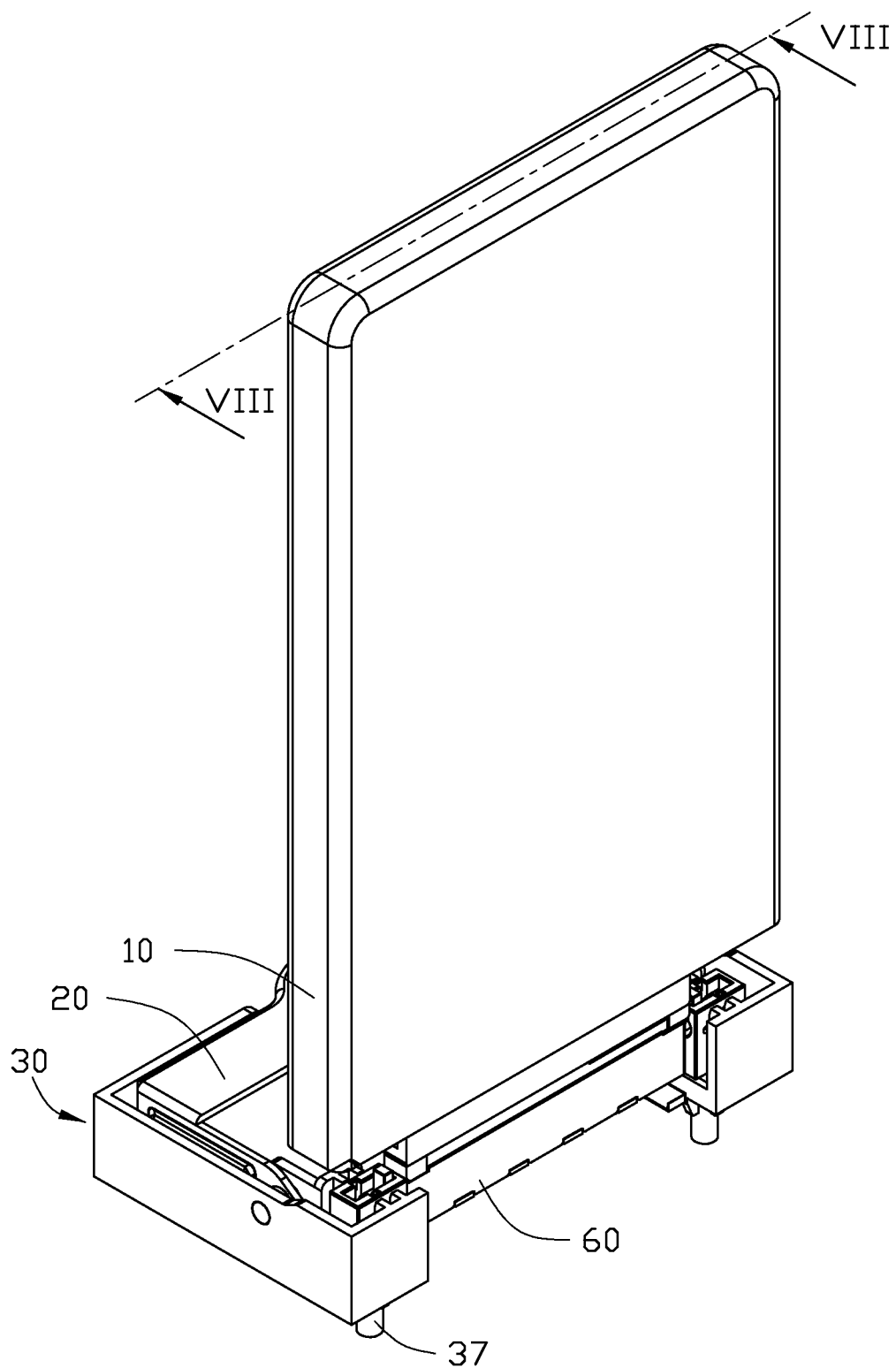
FIG. 7 is an assembled, isometric view of the movable member of FIG. 1.

The enclosure 30 comprises a bottom plate 31, two side plates 33 extending substantially perpendicular from two ends of the bottom plate 31; two back plates 35, and a plurality of supporting posts 37 extending substantially perpendicular from the bottom plate 31 (shown in FIG. 7). A securing post 310 extends substantially perpendicular from the bottom plate 31. Each side plate 33 defines a securing hole 330. Two mounting plates 38 extend substantially perpendicular from the bottom plate 31. Two protruding blocks 350 align substantially parallel to each other and extend inwardly from each back plate 35. A receiving portion 352 is defined by two neighboring protruding blocks 350. Each back plate 35 defines a receiving groove 354. Each mounting plates 38 comprises a sidewall 380 extending substantially perpendicular from the bottom plate 31 and an extending wall 382 extending substantially perpendicular from the bottom plate 31. Another two protruding blocks 350 substantially parallel to each other extend outwardly from each extending wall 382. A protrusion 384 extends substantially perpendicular from each sidewall 380. Another protrusion 384 extends inwardly substantially perpendicular from each side plate 33. Each securing hole 330 extends through two neighboring protrusions 384. Each mounting plate 38 is substantially L-shaped. The sidewall 380 is substantially coupled to the extending wall 382 and is substantially parallel to the side plate 33. The extending wall 382 is substantially perpendicular to the back plate 35.

The bracket 20 comprises a bracket body 21, an operating member 50, and an elastic device 70. In one embodiment, the elastic device 70 is a spring. The bracket body 21 pivots and is mounted to the enclosure 30 by two fastening members 80. Each fastening member 80 comprises a head portion 81 and a tail portion 83 extending from the head portion 81. An area of the cross section of the head portion 81 is greater than an area of the cross section of the tail portion 83. The bracket 21 comprises a base 23 and two supporting arms 24. The base 23 comprises a mounting portion 230 and two extending portions 232. The mounting portion 230 defines two through holes 234 and three mounting holes 236. Each supporting arm 24 comprises a supporting portion 240 and a pivoting portion 242 extending from the supporting portion 240. Each pivoting portion 242 is substantially bent. Each pivoting portion 242 defines a pivot hole 244 and a receiving hole 246.

The operating member 50 comprises a cover 51, two elastic pieces 53, and three mounting legs (not shown) corresponding to the three mounting holes 236. The cover 51 comprises an inclined operating portion 510 and a surrounding portion 512 extending from the operating portion 510. The surrounding portion 512 surrounds the operating portion 510. The operating portion 510 is substantially circular. The mounting legs extend from the operating portion 510 and are located in the surrounding portion 512. Each elastic piece 53 comprises an elastic portion 530 substantially extending perpendicular from the cover 51 and a flange 532 extending outwardly from the elastic portion 530. Each elastic piece 53 is substantially L-shaped. An acute angle is defined between the operating portion 510 and the elastic portion 530. The elastic devices 70 are configured to be mounted in the surrounding portion 512 and to resist the operating portion 510. The elastic portions 530 are substantially parallel to each other.

FIGS. 3-6 illustrate that each movable member 40 comprises a movable body 41. Each movable body 41 comprises a main portion 43, a first mounting posts 44, and two second mounting posts 45. The main portion 43 comprises a top portion 46, two first side portions 47, and two second side portions 48. Each first mounting post 44 extends from an outside of the first side portion 47. Each second mounting post 45 extends substantially perpendicular from one of the two second side portions 48. The main portion 43 comprises a movable portion 460 and a guide hole 480 receiving the movable portion 460. The guide hole 480 is defined extending through the two second side portions 48. The movable portion 460 comprises two narrow portions 462 and a wide portion 464 coupled between the two narrow portions 462. The two narrow portions 462 are substantially perpendicular to the wide portion 464. The movable portion 460 is substantially X-shaped. Each first side portion 47 defines a first sliding slot 470 coupled to one corresponding narrow portion 462 and a second sliding slot 472. A "T" shape is defined between one first sliding slot 470 and one corresponding second sliding slot 472. The main portion 43 comprises a sliding surface 484. The movable block 42 comprises a block body 420, two protruding posts 422, and an engaging block 423. The protruding posts 422 and the engaging block 423 extend substantially perpendicular from three sides of the block body 420. The engaging block 423 comprises a supporting surface 424, a connecting surface 425 extending from the supporting surface 424, and a guiding surface 426 extending from the connecting surface 425. The connecting surface 425 is substantially curved. The block body 420 comprises a resisting surface 428 and a contacting surface 429. An acute angle is defined between the resisting surface 428 and the contacting surface 429.

Figure 6:
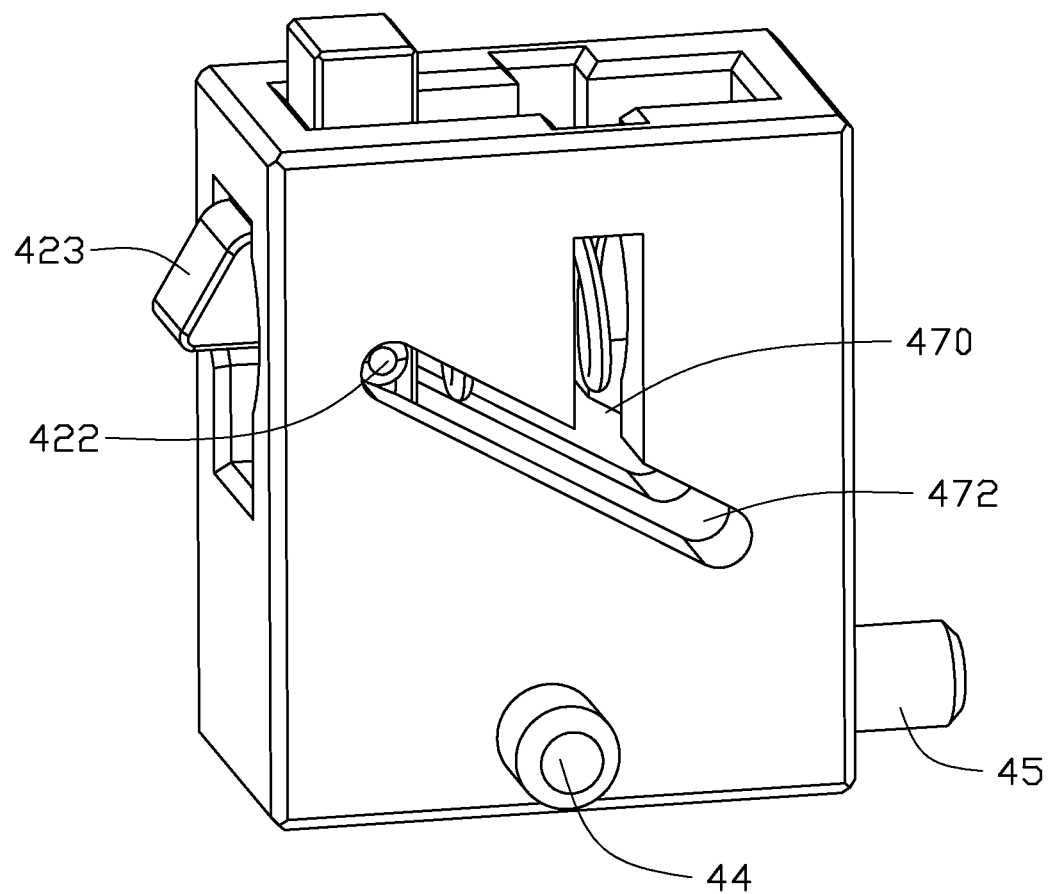
FIG. 6 is similar to FIG. 5, but the elastic device is relaxed.

In assembly, two elastic devices 70 are placed in the corresponding movable portions 460. The elastic devices 70 are pressed to enable one end of each the two elastic devices 70 to abut against inside wall of the corresponding second sidewall 48. The movable blocks 42 are placed in the corresponding movable portions 460. Each protruding post 422 moves to the corresponding first sliding slot 470 from the corresponding narrow portions 462. The other end of the two elastic devices 70 abuts against the contacting surface 429. FIG. 6 illustrates when the elastic devices 70 rebound to enable the movable block 42 to move on the sliding surface 482 in a first direction A toward the enclosure 30 (shown in FIG. 8). Each protruding post 422 slides to the corresponding second sliding slot 472 from the corresponding first sliding slot 470. The engaging block 423 is exposed out of the guide hole 480.

Figure 8:
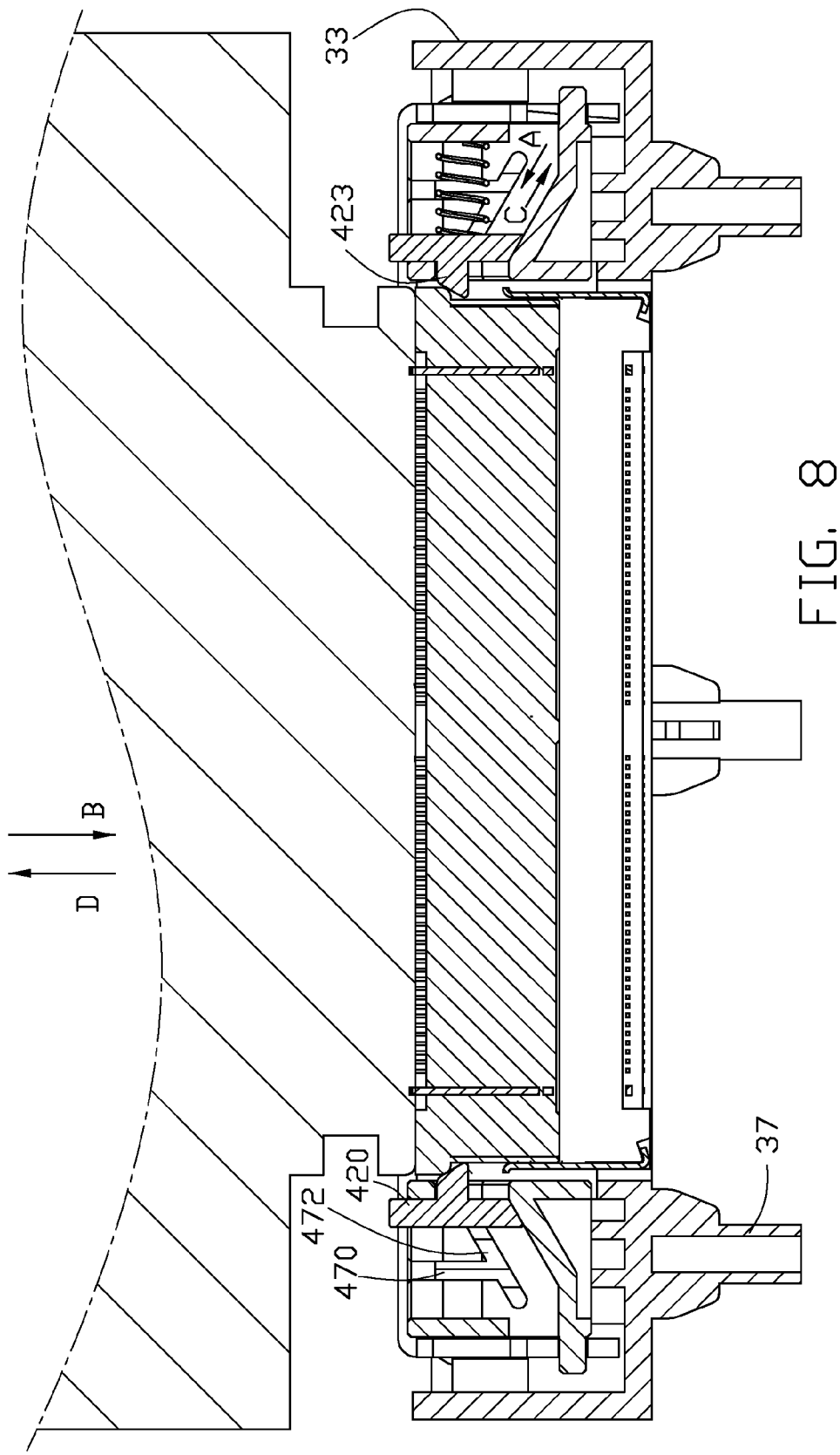
FIG. 8 is a cross-sectional view of the mounting apparatus of FIG. 7 along a line VIII-VIII.
Figure 9:
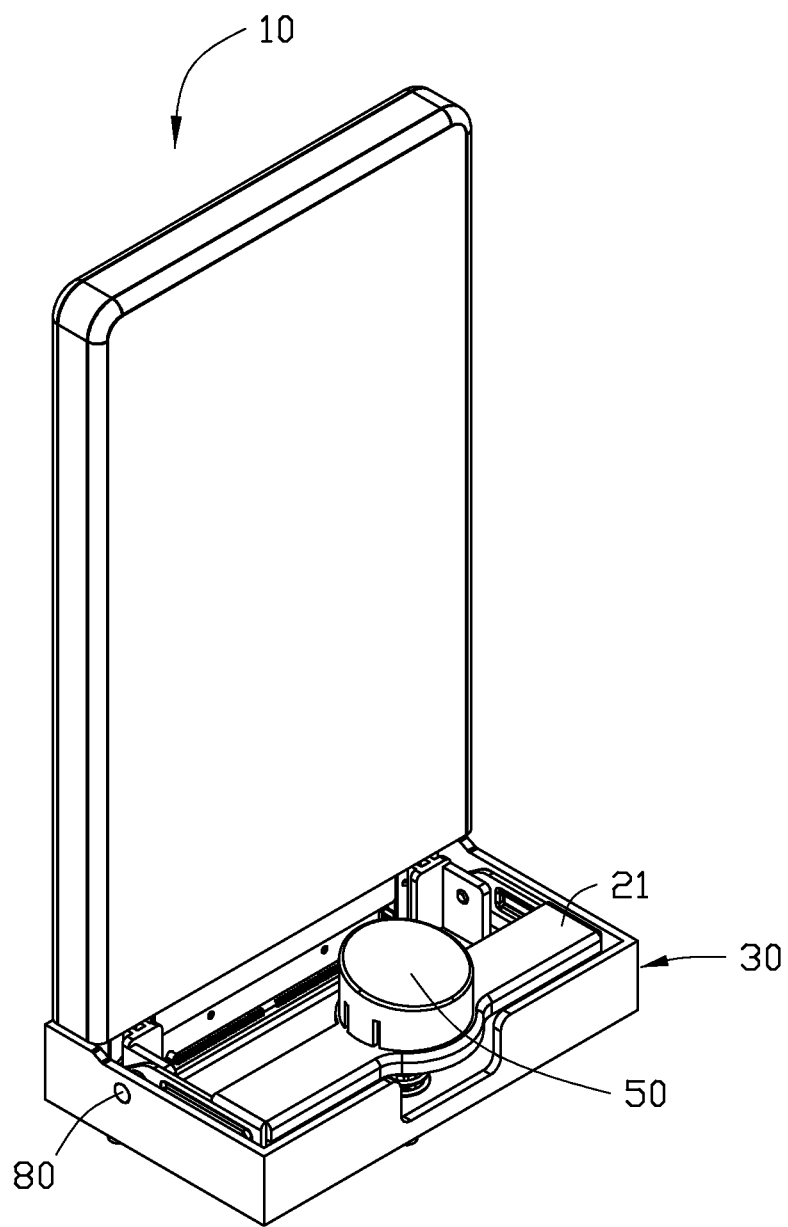
FIG. 9 is similar to FIG. 7, but an electronic component is inserted into a receiving member.

FIGS. 7 and 8 illustrate that the operating member 50 is moved toward the bracket body 21. Each elastic piece 53 is inserted into one corresponding through hole 234. Each flange 532 is engaged with an inside of the corresponding portion 230. The three mounting legs are secured in the corresponding mounting holes 236. Another elastic device 70 is placed on the bottom plate 31 and is placed over the securing post 310. The bracket body 21 and the operating member 50 are moved. The pivoting portion 242 is placed in the corresponding receiving section 386. The pivot hole 244 is aligned with one corresponding securing hole 330. The tail portion 83 of the fastening member 80 is inserted into the corresponding securing hole 330 and the corresponding pivot hole 244. The head portion 81 exposes out of the side plate 33. The elastic device 70 abuts between the bottom plate 31 and the mounting portion 230. The moveable member 40 is moved. The first mounting posts 44 are aligned with the corresponding receiving portions 352. The movable block 42 is received in the receiving groove 354. The second mounting posts 45 are received in the corresponding receiving hole 246. The first mounting posts 44 are movably received in the corresponding portions 352.

FIGS. 9-16 illustrate that when in use of the mounting apparatus, the electronic component 10 is placed on the receiving member 60. The electronic component 10 is inserted into the receiving member 60 toward the bottom plate 31 in a second direction B (shown in FIG. 8) toward the enclosure 30. The second direction B is substantially perpendicular to the bottom plate 31. The bent surface 130 of the contacting portion 13 abuts against the engaging block 423. The engaging block 423 slides on the bent surface 130. The movable block 42 moves on the sliding surface 482 in a third direction C (shown in FIG. 8) opposite to the first direction A to enable the elastic device 70 to be deformed. The elastic device 70 rebounds to drive the movable block 42 to move in the first direction A when the engaging block 423 is aligned with the receiving space 15, thereby the protruding post 422 slides along in second sliding slot 472. The engaging block 423 moves and engages in the receiving space 15.

When the electronic component 10 needs to be pulled out, the operating portion 510 is pressed by users in the second direction B to drive the mounting portion 230 to rotate relative to the enclosure 30 about the tail portion 83 of the fastening member 80. The sliding surface 482 abuts against the pushing surface 428. The movable body 41 moves in a fourth direction D opposite to the second direction B. The movable block 42 moves in the first direction A to push the electronic device body 11. The electronic component 10 can move in the fourth direction D until the electronic component 10 can be disengaged from the receiving member 60. It is convenient for users to bring out the electronic component 10. In one embodiment, a first acute angle is defined between the first direction A and the fourth direction D; a second acute angle is defined between the second direction B and the third direction C.

It is to be understood that even though numerous characteristics and advantages have been set forth in the foregoing description of embodiments, together with details of the structures and functions of the embodiments, the disclosure is illustrative only and changes may be made in the details, especially in the matters of shape, size, and arrangement of parts within the principles of the disclosure to the full extent indicated by the broad general meaning of the terms in which the appended claims are expressed.

What is claimed is:

1. A mounting apparatus comprising:
   an enclosure for securing a receiving member, the receiving member configured to receive an electronic component;
   a bracket mounted to the enclosure; and
   a movable member mounted to the enclosure, the movable member comprising:
     a movable body mounted to the bracket, and
     a movable block mounted to the movable body,
   wherein the bracket is rotatably urged in a first direction toward the enclosure, causing the movable body to move in a second direction away from the enclosure, thereby enabling the movable block to push the electronic component in the second direction.

2. The mounting apparatus of claim 1, wherein the bracket comprises a bracket body mounted to the enclosure and an operating member mounted to the bracket body; the movable body is mounted to the bracket body, the operating member is pressed in the first direction to drive the bracket body to rotate.

3. The mounting apparatus of claim 1, wherein the movable body defines a movable portion and a first sliding slot coupled to the movable portion, the movable block comprises a block body and a first protruding post extending from the block body, and the block body can move in the movable portion to enable the first protruding post to move to the first sliding slot.

4. The mounting apparatus of claim 3, wherein the movable body further defines a second sliding slot coupled to the first sliding slot, the first protruding post can move to the second sliding slot from the first sliding slot when the block body is in the movable portion.

5. The mounting apparatus of claim 3, wherein the movable block comprises a second protruding post extending from the block body, the movable body further defines another first sliding slot coupled to the movable portion, the movable portion comprises two narrow portions and a wide portion coupled between the two narrow portions, and the block body can move in the wide portions to enable the two protruding posts to move from the two narrow portions to the two first sliding slots.

6. The mounting apparatus of claim 3, wherein the movable portion is substantially X-shaped.

7. The mounting apparatus of claim 1, wherein the movable member further comprises an elastic device mounted between an inside wall of the movable body and the movable block, the movable block moves in a third direction toward the enclosure when the elastic device is inserted in the first direction, the elastic device is elastically deformed, the elastic device can drive the movable block to move in a fourth direction opposite to the third direction when rebounding, and the third direction is different from the first direction.

8. The mounting apparatus of claim 7, wherein an acute angle is defined between the first direction and the third direction.

9. The mounting apparatus of claim 2, wherein the bracket body comprises a base, the operating member comprises a cover mounted to the base and an elastic piece extending from the cover, and the elastic piece engages with the base.

10. The mounting apparatus of claim 9, wherein the bracket body further comprises a supporting arm extending from the base, and the movable body comprises a mounting post mounted to the supporting arm.

11. A mounting apparatus comprising:
    an enclosure for securing a receiving member, the receiving member configured to receive an electronic component;
    a bracket comprising:
      a bracket body movably mounted to the enclosure, and
      an operating member mounted to the bracket body; and
    a movable member mounted to the enclosure, the movable member comprising:
      a movable body mounted to the bracket body, and
      a movable block mounted to the movable body,
    wherein, the operating member is pressed in a first direction toward the enclosure to drive the bracket body to rotate, the movable body moves a second direction away from the enclosure, thereby enabling the movable block to move in a third direction away from the enclosure to push the electronic component and the electronic component moves in the second direction; the third direction is different from the first direction.

12. The mounting apparatus of claim 11, wherein the movable body defines a movable portion and two first sliding slots coupled to the movable portion, the movable block comprises a block body and two protruding posts extending from the block body, and the block body can move in the movable portion to enable the first protruding posts to move to the sliding slots.

13. The mounting apparatus of claim 12, wherein the movable body further defines two second sliding slots coupled to the first sliding slots, the protruding posts can move to the second sliding slots from the first sliding slots when the block body moves in the movable portion.

14. The mounting apparatus of claim 12, wherein a "T" shape is defined between one first sliding slot and one corresponding second sliding slot.

15. The mounting apparatus of claim 12, wherein the movable portion comprises two narrow portions and a wide portion coupled between the two narrow portions, and the block body can move in the wide portions to enable the two protruding posts to move from the two narrow portions to the two first sliding slots.

16. The mounting apparatus of claim 11, wherein the second direction is opposite to the first direction.

17. The mounting apparatus of claim 11, wherein the movable member further comprises an elastic device mounted between an inside wall of the movable body and the movable block, the movable block moves in a fourth direction opposite to the third direction when the elastic device is inserted in the first direction, the elastic device is elastically deformed, and the elastic device can drive the movable block to move in the third direction when rebounding.

18. The mounting apparatus of claim 11, wherein the bracket body comprises a base, the operating member comprises a cover mounted to the base and an elastic piece extending from the cover, and the elastic piece engages with the base.

19. The mounting apparatus of claim 18, wherein the bracket body further comprises a supporting arm extending from the base, and the movable body comprises a mounting post mounted to the supporting arm.

20. The mounting apparatus of claim 11, wherein an acute angle is defined between the second direction and the third direction.

\* \* \* \* \*